Aug. 8, 1933.  E. V. TAYLOR  1,921,593
BRAKE
Original Filed Oct. 30, 1926  3 Sheets-Sheet 1
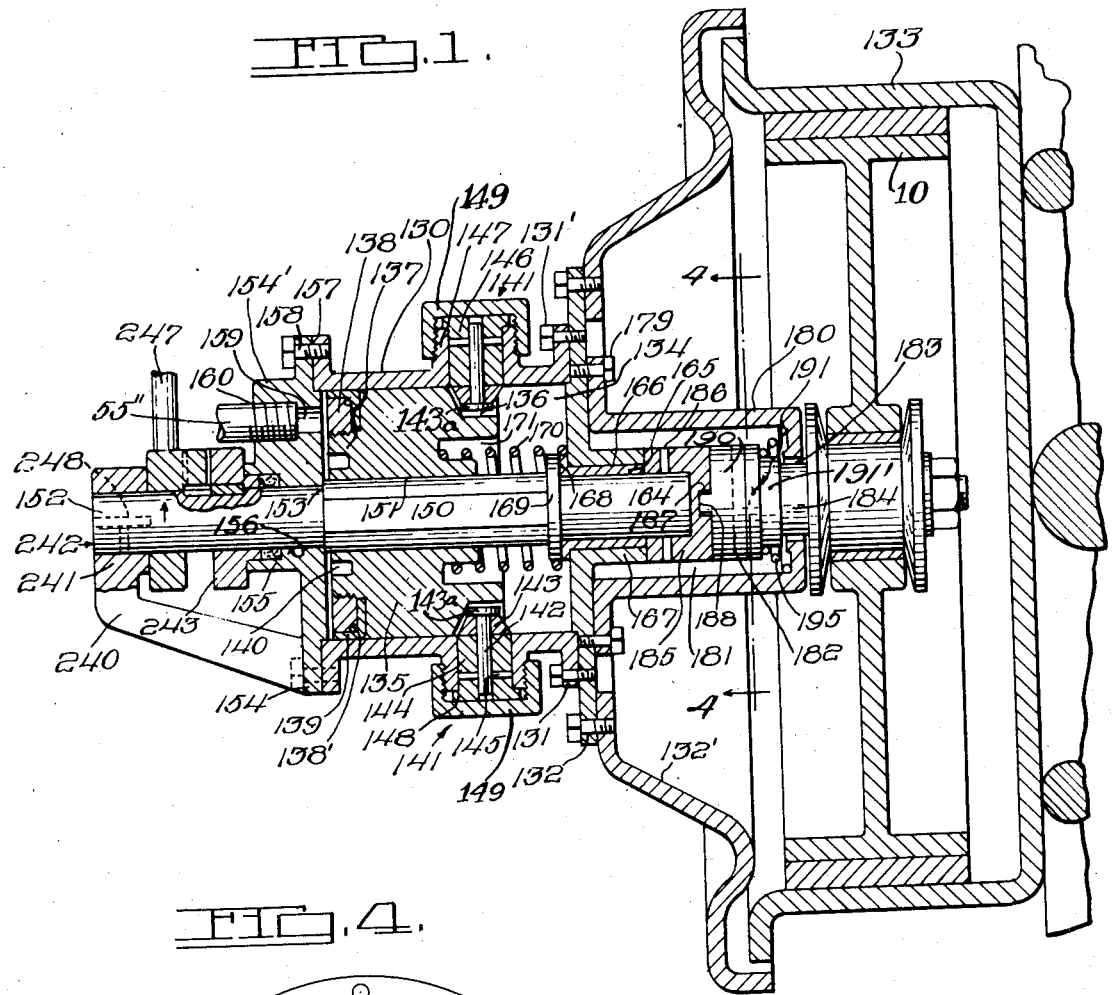
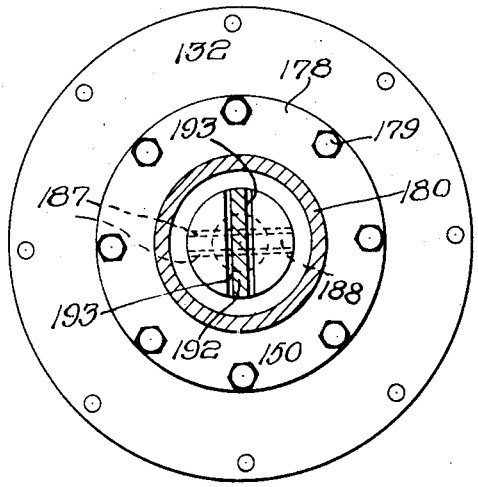
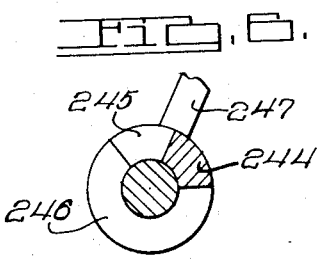
INVENTOR
Eugene V. Taylor
BY
Jn. W. McConkey
ATTORNEY Aug. 8, 1933.  E. V. TAYLOR  1,921,593
BRAKE
Original Filed Oct. 30, 1926  3 Sheets-Sheet 2

INVENTOR
Eugene V. Taylor
BY
ATTORNEY

Aug. 8, 1933.  E. V. TAYLOR  1,921,593
BRAKE
Original Filed Oct. 30, 1926  3 Sheets-Sheet 3
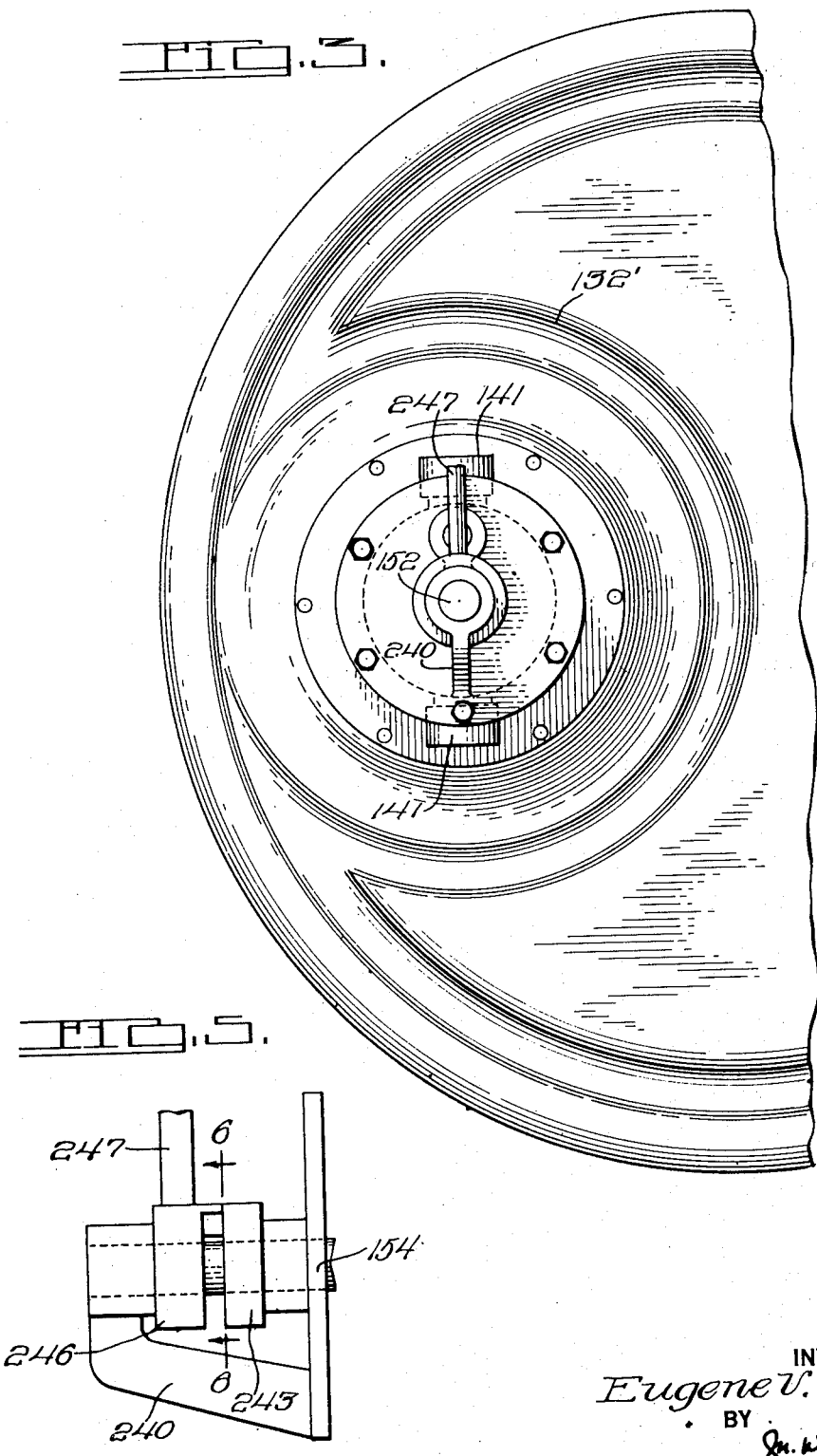
INVENTOR
Eugene V. Taylor
BY
ATTORNEY Patented Aug. 8, 1933

1,921,593

UNITED STATES PATENT OFFICE 1,921,593

BRAKE

Eugene V. Taylor, Chicago, Ill., assignor to Bendix Brake Company, South Bend, Ind., a Corporation of Illinois Original application October 30, 1926, Serial No. 145,109. Divided and this application May 7, 1928. Serial No. 275,669

12 Claims. (Cl. 188—106)

This invention relates in general to brakes and is illustrated as embodied in a brake mechanism of the hydraulic type. An object of the invention is to provide simple fluid-power operating means in conjunction with a suitable cam or equivalent applying device, the combined mechanism preferably being adapted to operate a standard multiple shoe brake.

In automobile practice, thus far it has not been feasible to adopt the common type of brake for use in a hydraulic or other fluid-power brake system without radical changes in construction. Obviously such a brake system would be more readily adapted to ordinary motor vehicles if the common type of retarding mechanism such as the multiple shoe brake could be readily connected to the system without necessitating any expensive changes in either the system or the brake.

I, therefore, propose to provide a novel fluid-operated device adapted to be coupled to a standard multiple shoe brake or other wheel-retarding structure such as the cam-operated brake employed so extensively on automobiles at the present time. By employing my device, it is possible to convert a linear movement created by the fluid system, into a rotary movement, for the purpose of turning the brake cam or equivalent applying device rendering operable the friction means.

An important feature of my invention relates to a novel attachment for the structure adapted to connect the cam or other friction shoe-operating means to said fluid-power means, the connection being so designed as to permit of substantially universal movement at the connection thereby enabling the cam structure or its equivalent to automatically balance the force applied to the shoe ends. In one desirable arrangement this is accomplished by coupling a hydraulic piston connecting rod to the cam shaft by a three-part tongue-and-groove structure, the arrangement permitting movement of the cam shaft with respect to the connecting rod in both vertical and horizontal planes.

Another important feature of the invention contemplates the provision of manually operated means preferably in juxtaposition and in line with the hydraulic coupling structure, and which is adapted to be utilized to operate my device in case of emergency or in case the hydraulic system fails to function properly. This novel feature of my invention permits of the brake structure being operated and controlled entirely independently of the hydraulic system.

In the embodiment illustrated in the drawings, the manually operable means is indicated by a novel lever-controlling structure mounted directly on a prolongation of the hydraulic piston connecting rod the means further comprising a bracket, attached to the hydraulic cylinder, the bracket having journaled in its end the end of the stub shaft or connecting rod prolongation. A suitable lever rotatably mounted on the shaft functions to actuate the same, by means of collars, one keyed to the shaft and the other fixed to the rotatable lever.

Other minor but important features of my invention relate to novelly arranged oil ducts functioning to properly lubricate the bearings and a novel guide structure fixed in the cylinder wall functioning to effect a rotary movement of the hydraulic piston.

The advantages of the arrangements set forth, and various additional features of novelty and desirable details of construction will be apparent from the following description of one illustrated embodiment shown in the accompanying drawings, in which:

Figure 1 is a sectional view through the hydraulic cylinder, manually operated actuating structure, and flexible coupling, features which constitute the essence of my invention, together with fragmentary parts of the wheel and brake structure;

Figure 2 is a section taken substantially on the line 2—2 of Figure 1, looking in the direction of the arrows, the brake shoe structure being shown in elevation and the hydraulic coupling by dotted lines;

Figure 3 is a fragmentary end elevation indicating the brake drum closure plate, together with the coupling and control means;

Figure 4 is a sectional view taken substantially on the line 4—4 of Figure 1, indicated by the arrows;

Figure 5 is a more or less diagrammatic view of my manually-controlled operating structure;

Figure 7:
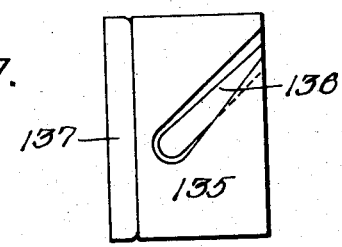
Figure 7 is a detail view of the piston or plunger employed in my novel cylinder, showing the contour of the groove and its periphery.

In the embodiment selected for illustration, a cylinder 130 is provided with an annular flange 131 suitably attached by means of bolts 131', or equivalent fastening means, to a plate 132. This plate 132 may be connected in any desirable manner to the closure or backing plate 132' associated with the brake drum 133. Positioned within the cylinder bore 134 is a piston 135 having a plurality of diagonal grooves 136 therein as clearly indicated in Figure 7. One end of the piston 135 is reduced at 137 and may be threaded to receive a ringlike clamping member 138. The clamping ring 138 serves to retain in place a cupped leather member or packing 139 which engages the inner periphery of the cylinder 130. A supplemental clamping ring 138' may be housed in a rabbeted portion of the ring 138 to more securely fasten the leather member in place. The same end of the piston 135 may be provided with an annular pocket 140 which is adapted to aid in the initial movement of the piston as is obvious from the illustration in Figure 1.

Roller units 141 are arranged to co-operate with the grooves 136. Since the units 141 and their associated mountings are identical in construction, it is believed a description of one will suffice for all. Each roller 143 may be slightly tapered and may be loosely mounted on a shaft 142 having a head portion 143ª. The shaft 142 telescopes a sleeve 144 and may be suitably connected thereto by means of a pin 145. Sleeve 144 extends into an aperture 146 partly defined by the cylinder wall 130 and partly defined by a boss 147 integrally or otherwise secured to the cylinder wall. The sleeve 144 has an enlarged or head portion 148 for preventing lateral movement of the roller 141 within the cylinder. A cap 149 may be threaded onto the boss 147 and serves to completely inclose the mechanism associated with each roller unit. Obviously by removing the cap 149, access may be had to the roller mechanism for the purpose of making replacement, that is to say, should the roller, for example, wear out, the same may be replaced by removing the cap 149 and removing the roller unit from the cylinder.

The plunger or piston 135 may be provided with a polygonal or other out-of-round shaped opening located axially of the plunger. Extending through this opening, designated by the reference character 151 is a correspondingly shaped connecting rod 150. One end of the rod 150 may be reduced at 152 to form a shoulder 153 which abuts against a closure member 154. The closure member 154 is provided with an enlarged portion 155 defining a pocket 156 for receiving the reduced end 152 of rod 150. In reality, the portion 156 serves as a bearing for the end of the shaft associated therewith. The closure member 154 may be suitably secured to a flange 157 formed integral with the cylinder 130 by means of bolts 158 or the equivalent thereof. Also the member 154 may be provided with an enlargement 154', said enlargement having formed therein an opening 159 communicating with the bore 134 of cylinder 130. This opening 159 also communicates with an opening 160 in which one end of a pipe line 55'' is threaded or otherwise attached. This pipe line communicates with the hydraulic or other fluid-power system (not shown).

The other end of the rod 150 is also reduced and circular, as indicated at 164. This portion 164 is journaled in a sleeve bearing member 165 extending through an aperture 166 formed in a plate 132. Plate 132 may be provided with a hub portion 167 integrally or otherwise secured thereto and concentric with connecting rod 150. This hub portion 167 encircles part of the sleeve 165. Sleeve 165 may be provided with an annular flange 168 which abuts against the inner face of plate 132. Furthermore rod 150 may be provided with an annular shoulder 169 positioned between the flange 168 and the out-of-round shaped portion of the shaft. A compression spring 170 encircles the shoulder 169, as well as the adjacent portion of the shaft. One end of this spring 170 preferably abuts against the inner face of the plate 132 and the other end may extend into an annular pocket 171 abutting against the associated portion of the piston 135. This compression spring serves to normally maintain the piston 135 in the position shown in Figure 1.

One particularly important feature of my invention relates to the novel flexible coupling means interposed between the hydraulic cylinder and the friction operating structure. In the arrangement illustrated, a cuplike housing member 180, clearly indicated in Figures 1 and 4, is positioned in axial alignment with shaft 150 and is attached by suitable fastenings, such as bolts 179, to the plate 132. This cup 180 has a bore 181 in which is preferably disposed a three-part coupling member designated generally by reference character 182. The purpose of this coupling member 182 is to couple the portion 164 of rod 150 to the shaft 184 which carries the friction operating means indicated generally by the reference character 10 in Figure 1.

Shaft 184 extends through an aperture 183 in the end of the cup 180 and is normally positioned in axial alignment with the rod 150. The first member of coupling 182 may be fastened to the shaft portion 164 by means of a pin 186. This part 185 of the coupling abuts against the end of the hub 167 of plate 132. Part 185 may be provided with a transverse groove 187 adapted to receive tongue 188 formed upon an intermediate coupling part 190. As indicated in Figures 1 and 4, the tongue 188 is freely movable in the transverse groove 187, the latter being enlarged to receive the same. Fastened to the end of the shaft 184 inside of the cup 180 is a third coupling part 191 having a tongue 192 indicated in Figure 4 and preferably disposed at right angles to the tongue 188. The tongue 192 extends into an enlarged groove 193 formed in the intermediate coupling part 190.

In general the coupling 182 permits of a substantially universal movement on the part of the shaft 184 through the intermediary of the tongue-and-groove connections. The loose connection between the tongues and their respective grooves in the coupling permits of movement in perpendicular and horizontal planes passing through the connecting rod. This flexible connection enables the cam or other shoe operating means to automatically center itself with respect to the friction shoe ends.

A compression spring 195 is positioned within the cup 180 with one end abutting against the end of the cup and the other end abutting against a reduced portion 191' in the third coupling part 191. This spring serves at all times to urge the coupling parts into engagement.

Figure 6:
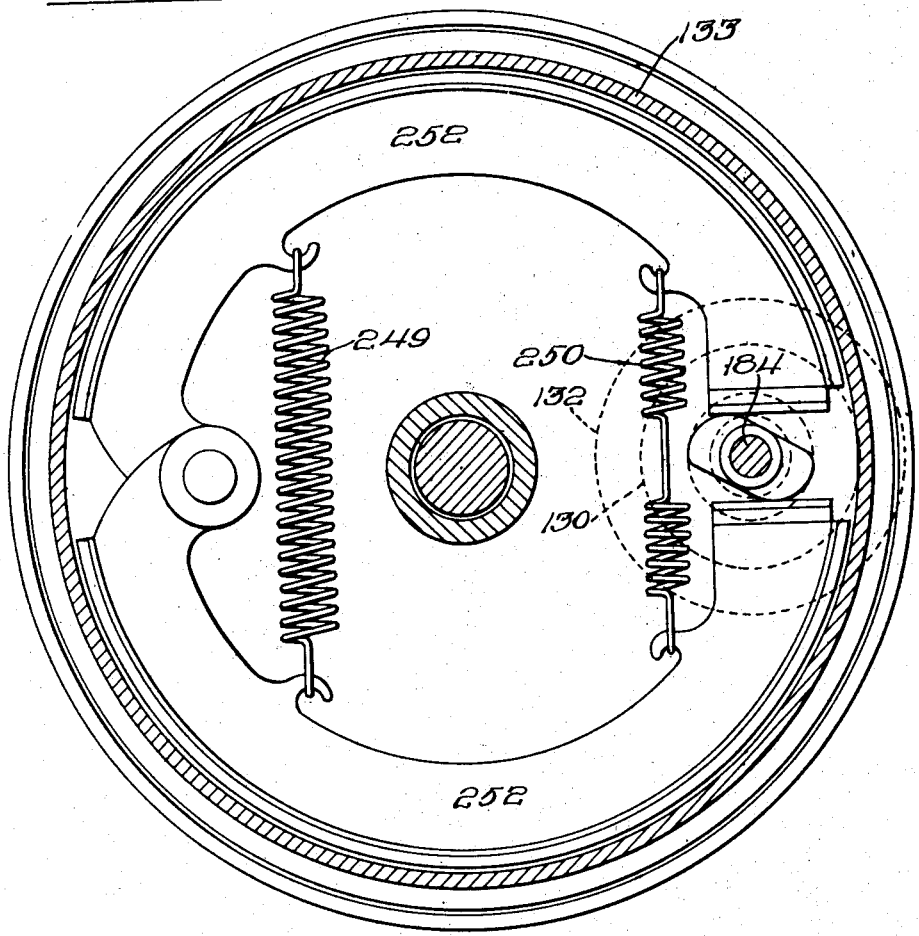
Figure 6 is a sectional view of the lever structure taken on line 6—6 of Figure 5.

According to another important feature of my invention, provision is made for manually turning the brake operating shaft in case of emergency or in case the hydraulic system fails to function properly. In the illustrated embodiment clearly indicated in Figures 1, 5 and 6 the portion of the shaft 152 is extended through an aperture in the cap 154 connected to the cylinder 130.

A bracket 240 is connected to the cap 154 which cap may, as illustrated constitute the end plate of the fluid cylinder. A bearing 241 may be formed in the end of the bracket for receiving the end portion 242 of stub shaft 152. Rigidly connected to the shaft 152 intermediate the projection 155 and the journal 241 is a collar 243 having a single clutch member 244 adapted to engage a clutch tooth 245 attached to a collar 246 loosely mounted on shaft 152. The collar 246 has connected thereto a lever arm 247. The arm 247 and collar in reality constitute part of the lever suitably connected to an emergency brake such as that commonly employed on an automobile. Suitable oil lubricating ducts 248 are provided in the shaft excating ducts 248 are provided in the shaft extension to properly lubricate the bearing structure associated therewith.

Upon the application of pressure to the piston within the cylinder 130, shaft 152 will be rotated in the direction shown by the arrow in Figure 1. However, should the hydraulic system fail and it become necessary to operate the brake through the emergency means, such as the conventional hand lever, the same may be accomplished by manually turning the collar 246 about the shaft 152 bringing the clutch tooth 245 into engagement with the clutch tooth 244, thus causing shaft 152 to rotate, moving the piston therewith. Return springs 249 and 250, part of the retarding means, and spring 170 acting within the hydraulic cylinder function to return the parts of the several operators to their initial or inactive position.

It will thus be seen that I have provided a compact brake-operating structure comprising both manual and fluid operated means, preferably mounted on a common shaft but otherwise independent of each other. The fluid-operated means may, if desired, be flexibly connected to a conventional applying structure for the retarding structure such as the common type of multiple shoe brake, shown with friction means including rigid shoes 252, permitting the applying structure such as the conventional cam to center itself with respect to the shoes.

By my device the well-known hydraulic or other fluid power system may be directly coupled with the conventional multiple shoe brake or other retarding structure without either extensive or expensive changes in either the brake or the system and my invention has the further advantage of coupling a substantially independent manually controlled emergency device with the system whereby efficient braking is guaranteed at all times.

While one illustrative embodiment of my invention has been described in detail, it is not my intention to limit its scope to that particular embodiment or otherwise than by the terms of the appended claims. Most of the subject-matter herein claimed is to be regarded as divided from my prior application No. 145,109, filed October 30, 1926.

I claim:

1. A brake-operating mechanism comprising, in combination, a brake drum and retarding means therefor, operating means for said retarding means located within said drum, a hydraulic system, hydraulic control means coupling with said hydraulic system with said operating means and having a stub shaft protruding therefrom and a separate manually actuated control means directly connected to said hydraulic actuating means, mounted upon said shaft.

2. A brake-operating mechanism comprising, in combination, a brake drum, a backing plate, retarding means for said drum within said plate, floating brake-applying means located within said drum adapted to actuate said retarding means, a fluid-operated actuating means fixedly attached to said packing plate outside of said drum, and a substantially universal connection between said fluid-actuating means and said brake-applying means.

3. A brake assembly comprising, in combination, a drum, friction means within the drum and floating applying means therefor, a closure plate for said drum, a fluid-operated actuating means attached to said closure plate outside of said drum, and means having a substantially universal movement connecting said fluid-actuating means with said friction-applying means.

4. A fluid-operated cylinder comprising, in combination, a flanged bushing mounted in one end of the cylinder, a piston provided with a polygonal-shaped axially extending opening and a connecting rod mounted therein, said rod provided, intermediate its ends, with a flange abutting said flange on said bushing.

5. In a fluid-operated actuating structure, a cylinder, a cylindrical boss on said cylinder, and guide means attached to said cylinder comprising a sleeve within said boss portion, a headed shaft non-rotatably attached to said sleeve, a tapered roller rotatably mounted on said shaft abutting the head thereof, and cap means, attached to said boss, to cover said sleeve and shaft.

6. In a braking system having a rotating part, braking members associated with said part, operating means for said braking members, a rotatable shaft connected to said operating means, separate fluid and manually controlled control means connected to said shaft, said fluid control means comprising a cylinder having its longitudinal axis aligned with the axis of said shaft.

7. A brake assembly comprising, in combination, a drum, friction means within the drum, a closure plate for said friction means, an operating device associated with said friction means within said drum, a shaft connected to said operating device, and a plurality of control devices for actuating said shaft located without said plate, one of said control devices comprising a cylinder through which said shaft extends.

8. A brake assembly comprising, in combination, a drum, friction means within the drum, a closure plate for said friction means, an operating device associated with said friction means within said drum, a shaft connected to said operating device, and a plurality of control devices structurally different, for actuating said shaft and located without said plate, one of said control devices comprising a cylinder and a piston positioned within said cylinder and having an opening through which said shaft extends and rotatable with said shaft.

9. A brake assembly comprising, in combination, a drum, friction means within the drum, a closure plate for said friction means, an operating device associated with said friction means within said drum, a rotatable shaft connected to said operating device, fluid and mechanical control devices for actuating said shaft, said fluid control device comprising a cylinder, a piston mounted in said cylinder and keyed to said shaft, a cam groove and a cam roller operatively associated with said piston and cylinder, whereby longitudinal movement of said piston effects rotary movement of said shaft.

10. A hydraulic brake system comprising a drum, friction means associated with said drum, an operating device associated with said friction means, a rotatable shaft connected to said operating device, a plurality of control devices for actuating said shaft including a fluid pressure cylinder concentric with said shaft, and means associated with said cylinder for rotating said shaft.

11. A hydraulic braking system comprising a drum, friction means associated with said drum, an operating device for said friction means, a shaft connected to said operating device, and a plurality of control devices for actuating said shaft including a fluid pressure cylinder provided with bearings for supporting said shaft.

12. In a brake operating assembly, a fluid power cylinder, and a manually operated brake applying actuator including a rotatable shaft, bearings for said shaft a portion of one of which forms a closure for one end of the cylinder.

EUGENE V. TAYLOR.